United States Patent [19]

Nelson

[11] Patent Number: 5,537,497
[45] Date of Patent: Jul. 16, 1996

[54] OPTIMIZED ELECTRODE GEOMETRIES FOR DIGITAL OPTICAL SWITCHES

[75] Inventor: William H. Nelson, Grafton, Mass.

[73] Assignee: GTE Laboratories Incorporated, Waltham, Mass.

[21] Appl. No.: 153,243

[22] Filed: Nov. 16, 1993

[51] Int. Cl.$^6$ ........................................... G02B 6/26
[52] U.S. Cl. ................. 385/22; 385/14; 385/15; 385/16; 385/40; 385/45; 385/46; 385/131; 385/132
[58] Field of Search ........................ 385/14, 15, 16, 385/18, 22, 24, 31, 39, 40, 45, 46, 129, 130, 131, 132

[56] References Cited

U.S. PATENT DOCUMENTS 4,846,540  7/1989  Kapon ............................... 385/45 X

OTHER PUBLICATIONS

Soole, J. B. et al. "Fast high-efficiency integrated waveguide photodetectors using novel hybrid vertical/butt coupling geometry" Applied Physics Letters, vol. 61, Jul. 6, 1992 No. 1 pp. 13–15.
Fouckhardt, H. et al "All-optical switching in waveguide X junctions" Journal of the Optical Society of America B (Optical Physics) vol. 7 No. 5 pp. 803–809 May 1990.
Silberberg, Y. et al. "All-optical phase- and power-controlled switching in nonlinear waveguide junctions" Optics Letters, vol. 13, No. 12, pp. 1132–1134, Dec. 1988.
Friberg, S. R., et al. "Femtosecond switching ina dual-core-fiber nonlinear coupler", Optics Letters, vol. 13, No. 10 pp. 904–906, Oct. 1988.
Silberberg, Y. et al. "Nonlinear effects in waveguide devices" Journal de Physique Collogue, vol. 49 No. C–2, pp. 283–287, Jun. 1988.
Stegeman, G. I. et al. "Nonlinear all-optical guided-wave devices: operating characteristics and material trade-offs," Proceedings of SPIE—The International Society of Optical Engineering, vol. 864 pp. 24–34 1988.
Silberberg, Y. et al, "All-optical switching in nonlinear waveguide junctions", CLEO 88:Conference on Lasers and Electro-Optics. 1988 Technical Digest Series, vol. 7.
Silberberg, Y. et al. "Digital Optical Switch" Applied Physics Letters vol. 51 No. 16 pp. 1230–1232 Oct. 19 1987.
Thurston, R. N. et al. "Analysis of mode separation in multichannel branching waveguides", IEEE Journal of Quantum Electronics vol. QE–23, No. 8 pp. 1245–1255 Aug. '81.
Friberg, S. R. et al. "Ultrafast all-optical switching ina dual-core fiber nonlinear coupler," Applied Physics Letters, vol. 51, No. 15 pp. 1135–1137 Oct. 12 '87.

*Primary Examiner*—Brian Healy
*Attorney, Agent, or Firm*—V. F. Lohmann, III; L. E. Monks

[57] ABSTRACT

An X-geometry optical switch includes primary and secondary input branch waveguides merging at a junction, and first and second output branch waveguides optically coupled to the input branches at the junction. In a dual electrode configuration, one electrode is positioned on the primary input branch waveguide and the other electrode on one of the input branch waveguides. By applying a common or opposite polarity bias to the electrodes, changes in the waveguide refractive optical indices are produced so that light propagating through the primary input is directed to one of the output branch waveguides in accordance with adiabatic modal evolution. In another X-geometry optical switch, the electrode on the output branch is eliminated by fabricating the output branch waveguides to exhibit a natural index asymmetry. Accordingly, since there is a normal ON-OFF path designation without biasing, only the single electrode on the primary input branch waveguide is necessary to effect switching.

6 Claims, 3 Drawing Sheets

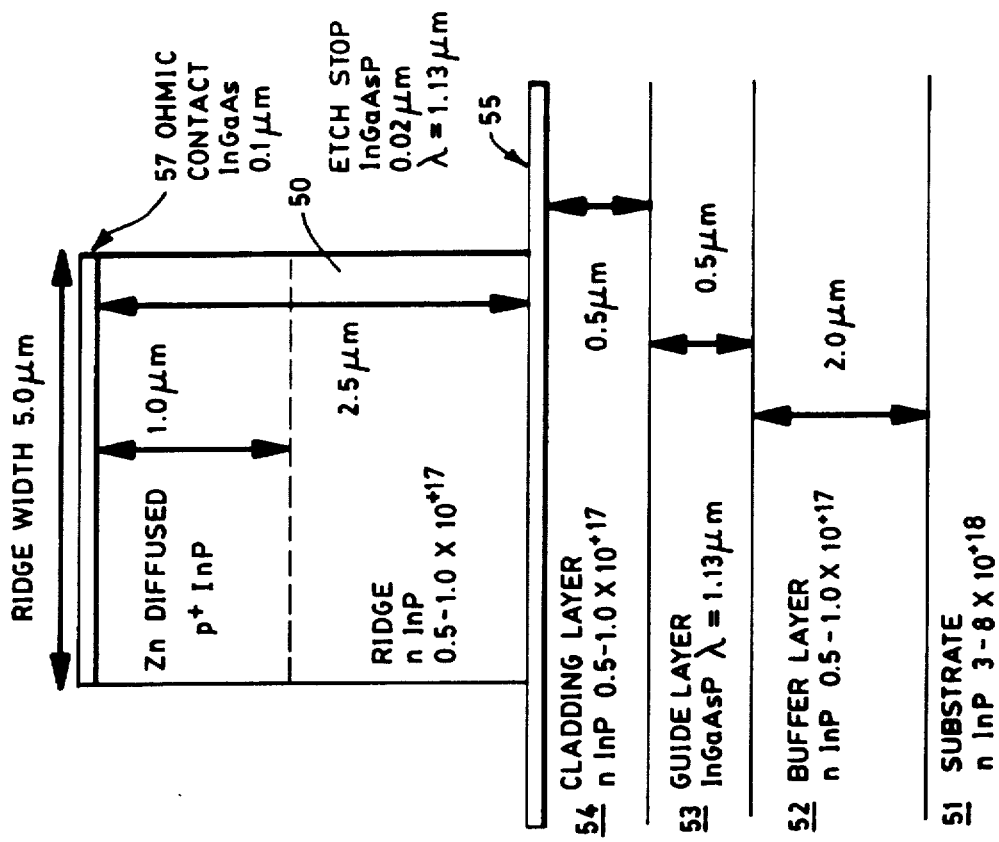
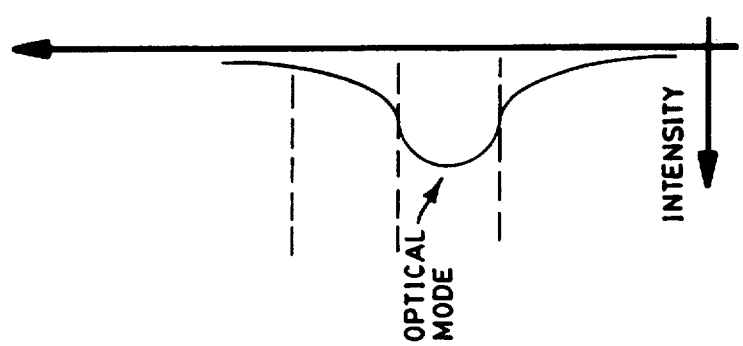
FIG. 4B
FIG. 4A

OPTIMIZED ELECTRODE GEOMETRIES FOR DIGITAL OPTICAL SWITCHES

FIELD OF THE INVENTION

The present invention relates to optical switching and, more particularly, to Y-junction digital optical switches.

CROSS-REFERENCES TO RELATED APPLICATIONS

This application is related to copending application entitled "ZERO HOLDING POWER DIGITAL OPTICAL SWITCHES" filed simultaneously herewith by the same inventor and assigned to the same assignee as the instant application, herein incorporated by reference.

BACKGROUND OF THE INVENTION

The shift to optical fiber as the preferred transmission medium in telecommunications has created the need for practical optical switches to perform the routing and distribution functions in the optical network. One category of optical switches is the waveguide spatial switch that selectably transfers an incoming optical signal to a specific one of a plurality of output waveguides, and is controlled by an externally applied electrical control signal without regard to the particular spectral or informational content of that signal. An optical spatial switch generally functions in one of three modes: (1) as a direct coupler switch by splitting single polarization monochromic light and recombining it constructively in the proper channel and destructively in the others; (2) as a gain switch by splitting the light and subsequently absorbing it in the unwanted channels, while amplifying it in the desired channel to compensate for the splitting loss; or (3) as an index switch by either focusing or reflecting the optical energy into the appropriate output channel.

However, a number of factors limit the performance of these different switches. For example, optical switches that depend upon mechanical or thermal mechanisms for switching are too slow for general use in a telecommunications network.

Direct coupler switches are critically dependent on the length of the active interference region for complete switching. They must be fabricated for operation at a particular wavelength and polarization, which eliminates use in a multi-wavelength network, or a network in which the polarization varies. Gain switches suffer from the high power requirements and complexity of the fast optical amplifiers in the output channels, which must be turned on for amplification or off for absorption.

An index switch can be fabricated to reflect or to focus light by changes in the index of refraction, where the index change is accomplished by either injecting or depleting electrical carriers in the switching region. The depletion mode of operation suffers from polarization sensitivity since the depletion region's large electrical field couples to the material's electro-optic coefficients.

Conventional optical index switches require electrodes on each output branch to effect index changes so that a propagation tendency in the higher index branch will result due to asymmetric adiabatic modal evolution. However, these index switches require stringent fabrication procedure and tolerances to minimze any coupling between the electrodes, particularly in the interaction region at the waveguide junction. Moreover, index switches require continuous electrical power to remain in a particular switching state.

SUMMARY OF THE PRESENT INVENTION

An optical switch, comprising a primary input branch for receiving an optical signal; a secondary input branch intersecting said primary input branch at a junction; a first output branch optically coupled to the primary and secondary input branches at the junction; a second output branch optically coupled to the primary and secondary input branches at the junction; first electrode means positioned on the primary input branch; and second electrode means positioned on one of said output branches.

BRIEF DESCRIPTION OF THE DRAWINGS

FIGS. 4a and 4b are cross-sectional views, including mode intensity diagram of a ridge waveguide structure to illustrate the epitaxial layering for an implementation of the present invention.

DETAILED DESCRIPTION OF THE PREFERRED EMBODIMENTS

Figure 1:
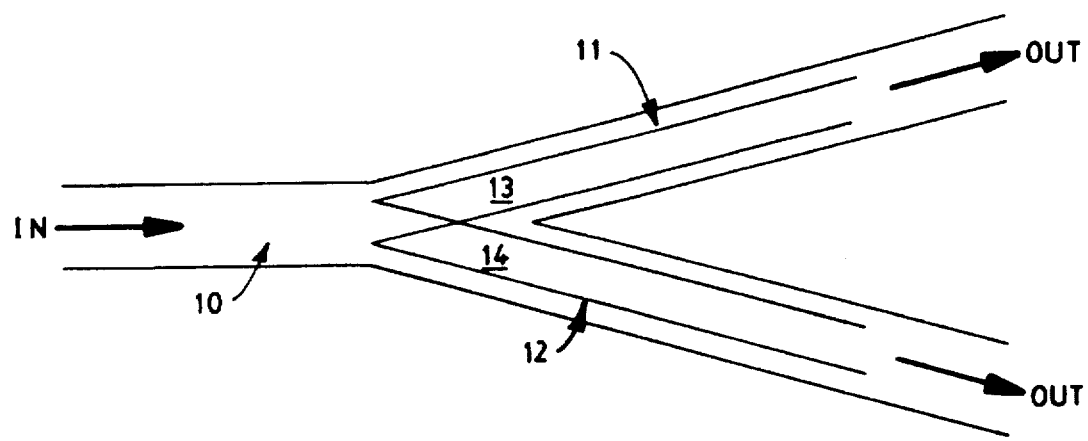
FIG. 1 is an upper plan view of a prior art optical switch.

FIG. 1 shows a prior art Y-junction optical switch with input branch 10 and output branches 11 and 12. The switch is constructed from a symmetric optical waveguide device which splits all of the bound optical modes equally between the output branches. By adding electrodes 13 and 14 to output branch waveguides 11 and 12, respectively, an asymmetry may be created between the refractive indices of the output waveguides with appropriate biasing, thereby rendering the optical device capable of adiabatic operation characterized by propagation of light in the fundamental and higher even-numbered modes down the output branch with the larger effective optical index, and propagation of light in the odd-numbered modes down the output branch with the smaller effective optical index. Thus, an asymmetric splitter is intrinsically digital if it contains only even or odd modes. The asymmetry is produced by injecting or depleting carriers with a forward or reverse bias to lower or elevate the refractive optical index of the waveguide. In the forward biased case, the injected current density holds the optical index to a lower value in the nonpropagating waveguide ("OFF" side of the switch), while in the reverse biased case, the voltage depleting the carrier density holds the optical index to a higher value in the propagating waveguide ("ON" side of the switch).

However, a clear disadvantage of these dual electrode optical switches is that energy must be continually applied to at least one of the electrodes in the form of a forward or reverse bias, as the case may be, to maintain the device in a particular switching state. Moreover, as noted above, the depletion mode suffers from polarization sensitivity. The device may also exhibit problems due to cross-coupling of the electrodes at the junction region.

Figure 2:
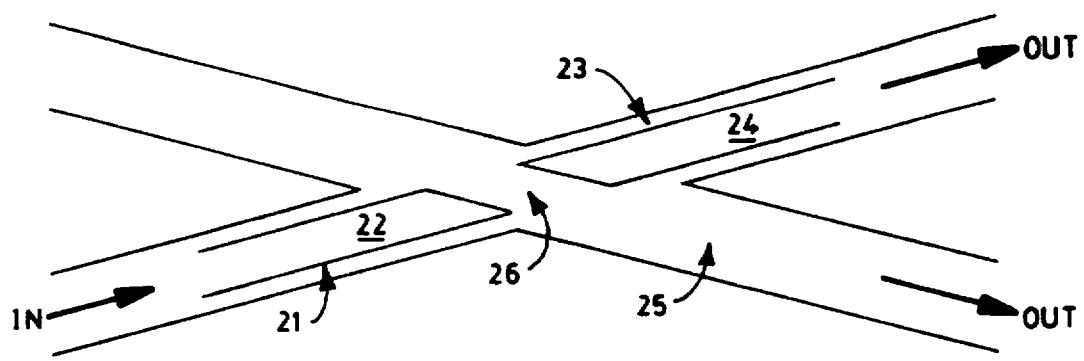
FIG. 2 is an upper plan view of an optical switch in accordance with a first embodiment of the present invention.

In accordance with one embodiment of the present invention, FIG. 2 discloses an X-shaped optical switch designed as an alternative to the prior art Y-junction switch geometry wherein one of the two electrodes is moved to the input side.

The switch includes an input branch 21 with electrode 22, first output branch 23 with electrode 24, and second output branch 25. The waveguiding structures are symmetrical in that the ridge waveguides of the input branch and both output branches are identically constructed. The switch creates an asymmetry of optical refractive indices between the output branches to induce propagation from the input branch 21 into only one of the output branches.

The switch specifically relies upon the following two properties to realize such asymmetry. First, there is the inherent preference of the individual optical modes, under adiabatic operation, to propagate in only one of the output waveguides. In particular, propagation of even mode signals occurs in the waveguide with the larger optical index, while propagation of odd mode signals occurs in the waveguide with the smaller optical index. Consequently, a device implementation with single mode optical waveguides is intrinsically digital.

Second, the invariance under time reversal of adiabatic propagation into and out of a waveguide junction. Accordingly, when an optical mode enters an X-junction from a higher index waveguide, the signal will exit the junction into the higher index waveguide. Likewise, when an optical mode enters an X-junction from a lower index waveguide, the signal will exit the junction into the lower index waveguide. The principles are suggested in the following discussion with reference to FIG. 2.

In the FIG. 2 switch, if electrodes 22 and 24 are both energized with the same polarity, of either sign, to effect common forward or reverse biasing, light propagating through input branch 21 will pass through the junction 26 and into branch 23. The reason is that the waveguides of branches 21 and 23 will both have an optical refractive index either higher or lower (depending upon the biasing) relative to waveguide branch 25.

Alternatively, if both electrodes are energized with opposite polarities, of either sign, the light propagating into junction 26 will bend and enter output branch 25. For example, if a forward bias is applied to electrode 22 and a reverse bias is applied to electrode 24, the index in branch 21 will be lowered and the index in branch 23 will be elevated. Thus, not only has the index of branch 21 been lowered relative to branch 23, but the index of branch waveguide 25 is also lower relative to branch 23. Accordingly, light propagating through the lowered index waveguide (branch 21) will exit junction 26 into the lower index waveguide (branch 25). The same propagation path exists if electrode 22 is reverse biased to increase its optical index while electrode 23 is forward biased to lower its optical index, since light propagating through an increased optical index waveguide (branch 21) will exit junction 26 into the higher index waveguide (branch 25).

Figure 3:
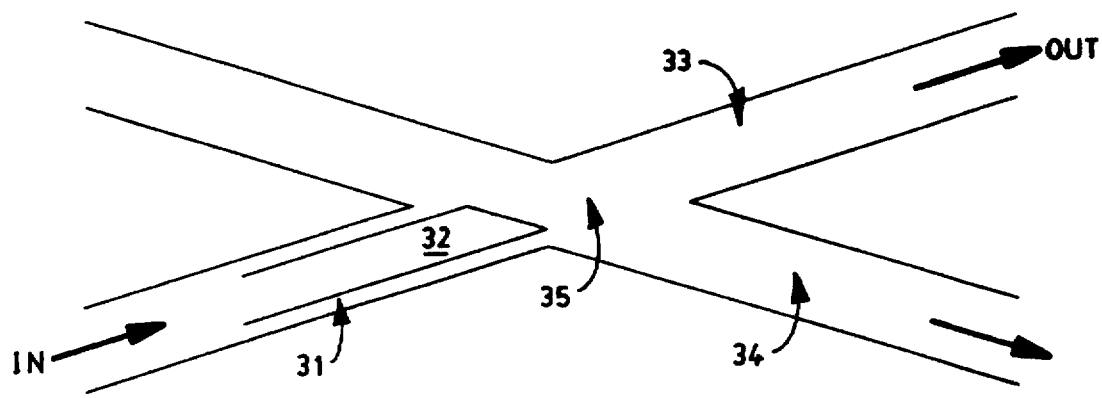
FIG. 3 is an upper plan view of an optical switch in accordance with a second embodiment of the present invention.

FIG. 3 discloses another X-shaped switch geometry in accordance with a second embodiment of the present invention. However, this switch is distinguished from FIG. 2 by the elimination of an electrode on the output branch which is made possible by designing the output waveguide branches to have a natural index asymmetry relative to one another. For example, output branch waveguide 34 is fabricated to have a fixed optical index larger than the index of the unenergized (e.g., no biasing) input branch waveguide 31, while the other output branch waveguide 33 has a fixed optical index smaller than the index of the unenergized branch 31.

Accordingly, when electrode 32 is forward biased to inject electrical carriers and thereby lowers the optical index of branch 31, the incoming light will propagate through junction 35 and into the lower index output waveguide (branch 33). Similarly, when electrode 32 is reverse biased to deplete electrical carriers and thereby increase the refractive index of branch 31, light propagating through input branch 31 will exit junction 35 into the higher index waveguide (branch 34).

FIG. 4 illustrates the epitaxial layering of a ridge waveguide heterostructure for implementing the branch waveguides of the present invention.

Lateral optical confinement is provided by 5 μm wide ridge waveguides, which intersect to form an X-junction with opening angles such as ½°, 1°, and 2°. At the point where the output waveguides branch, a 1 μm wide trench is etched to isolate the two distinct ridges. The depth of the p-n junction is a fraction of the ridge height for transverse current confinement. The pn-junction and the single electrode may extend the complete length of the output branches. Consequently, current is injected well beyond the active switching region, and is larger than would be required in an optimized structure. The separation of the waveguides is 30 μm at the output.

The epitaxial layer structure of the switch is grown by either halide VPE or MOCVD on an n+-InP substrate 51. A 2.0 μm thick InP buffer layer 52 is deposited first, followed by a 0.5 μm thick InGaAsP ($\lambda$=1.1 μm) guiding layer 53. A 0.02 μm thick InGaAsP ($\lambda$=1.1 μm) etch stop layer 55 is sandwiched between two InP cladding layers 54 and 56 having thicknesses of 0.5 μm and 2.5 μm respectively, to control the thickness of the thinner cladding layer over the length of the active region. The layers are capped by a 0.1 μm thick InGaAs layer 57 to facilitiate ohmic contact. All of the InP layers are sulphur doped to approximately $1\times10^{17}$ cm$^{-3}$, while the other layers are undoped.

The p-n junction in the output branching region of the optical switch is formed by selective area Zn diffusion in closed evacuated ampules using a $Si_3N_4$ mask and a $ZnP_2$+P (red) source. The diffusion is conducted at 500° C. for 15 to 30 minutes, depending upon the required depth. A combination of reactive ion etching ($CH_4/H_2$) and wet chemical etching ($H_3PO_4$:HCl=9:1) is used to fabricate the Y-branching waveguide ridges. A heat-treated polymide layer is applied to planarize the surface, followed by a Ti/Au metal evaporation to form the electrode and contact pads. The substrate is then thinned to approximately 100 μm, and a Ti/Au back ohmic contact is formed. After sintering the metal contacts at 400° C. for 20 seconds, the wafer may be cleaved into bars of X-junction switches having different branching angles, for example.

A mode that uniquely evolves away from the junction into a particular output waveguide, when propagated into the waveguide junction from an identical waveguide, will evolve into the correct mode at the junction, for evolving uniquely back into that particular output waveguide after passing the junction.

While there has been shown and described herein what are presently considered the preferred embodiments of the invention, it will obvious to those skilled in the art that various changes and modifications can be made therein without departing from the scope of the invention as defined by the appended claims.

I claim:

1. An optical switch, comprising:

a primary input branch for receiving an optical signal;

a secondary input branch intersecting said primary input branch at a junction;

a first output branch optically coupled to the primary and secondary input branches at the junction;

a second output branch optically coupled to the primary and secondary input branches at the junction;

first electrode means, energized with a first polarity, positioned on the primary input branch; and second electrode means, energized with a second polarity, positioned on one of said output branches;

wherein said optical signal is selectively switched between
the first output branch and the second output branch, responsive to said first polarity of said first electrode and said second polarity of said second electrode.

2. The switch as recited in claim 1 wherein primary the input branch includes:

a ridge waveguide heterostructure.

3. The switch as recited in claim 2 wherein the first and second output branches each include:

a ridge waveguide heterostructure.

4. The switch as recited in claim 2 wherein the respective ridge waveguide heterostructures of said primary input branch, first output branch, and second output branch each comprise:

an InP substrate;

an InP buffer layer disposed on the substrate;

an InGaAsP guiding layer disposed on the buffer layer;

an InP cladding layer disposed on the guiding layer;

an InGaAsP etch stop layer disposed on the cladding layer; and an InP cladding layer disposed on the etch stop layer.

5. A device, comprising;

primary input optical waveguide means;

secondary input optical waveguide means merged with said primary input optical waveguide means at a junction;

first output optical waveguide means optically coupled to the input optical waveguide means at the junction;

second output opt guide means optically coupled to the input optical waveguide means at the junction; an means for biasing the primary input optical waveguide means;

wherein a refractive index of said first output optical waveguide means is different than a refractive index of said second output optical waveguide means responsive to said means for biasing.

6. An optical switch, comprising:

an input branch for receiving an optical signal;

a first output branch optically coupled to the input branch and having a refractive index;

a second output branch optically coupled to the input branch, having an electrode disposed thereon, and having a refractive index in an unbiased state which is different than the refractive index of said first output branch.

* * * * *